Figure 1:
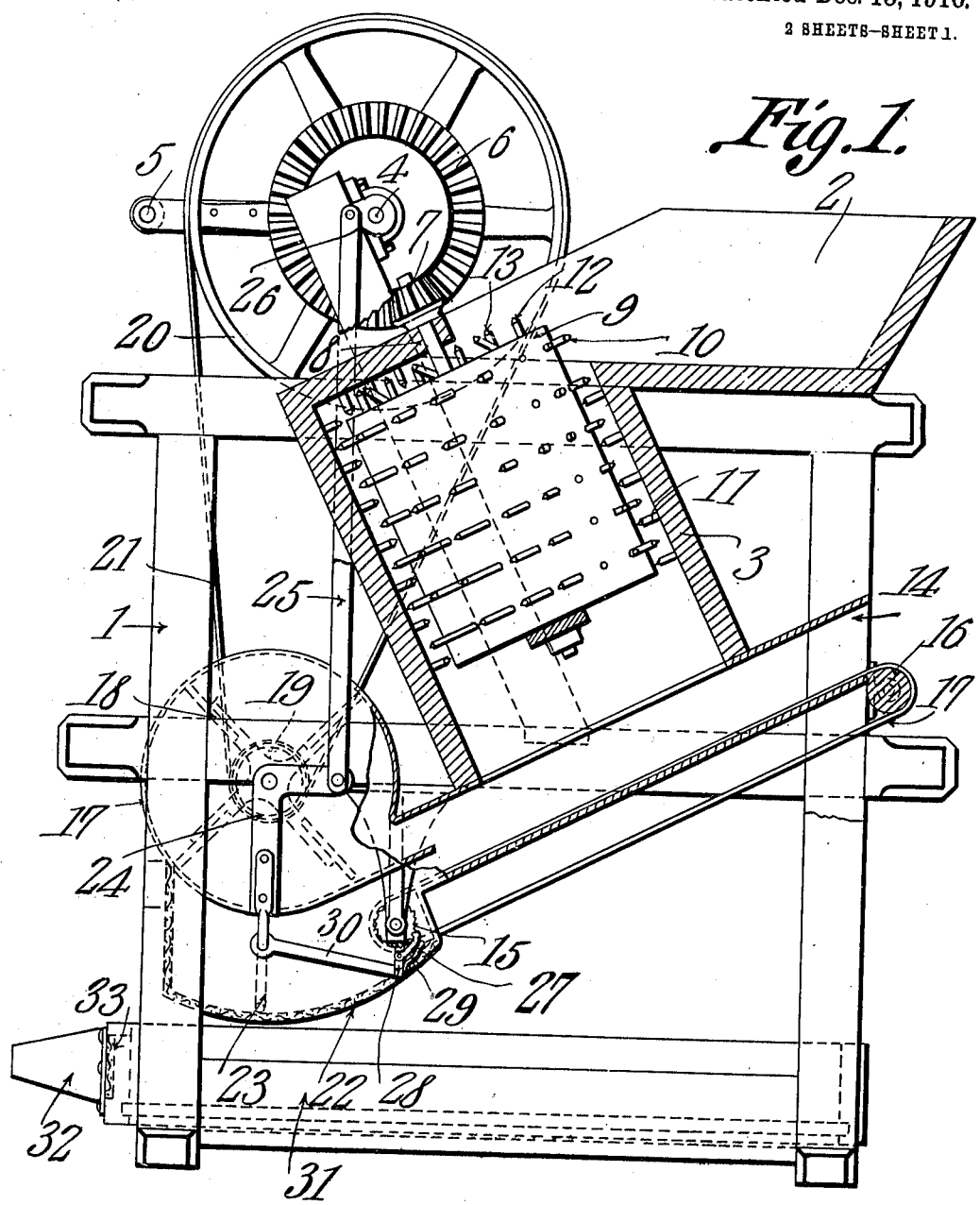

R. E. WRIGHT.
PEA THRESHER.
APPLICATION FILED MAR. 17, 1910.

978,529.

Patented Dec. 13, 1910.

2 SHEETS—SHEET 1.

Witnesses
E. F. Stewart
J. T. Lawson

Inventor
Robert E. Wright.
By C. A. Snow & Co.
Attorneys

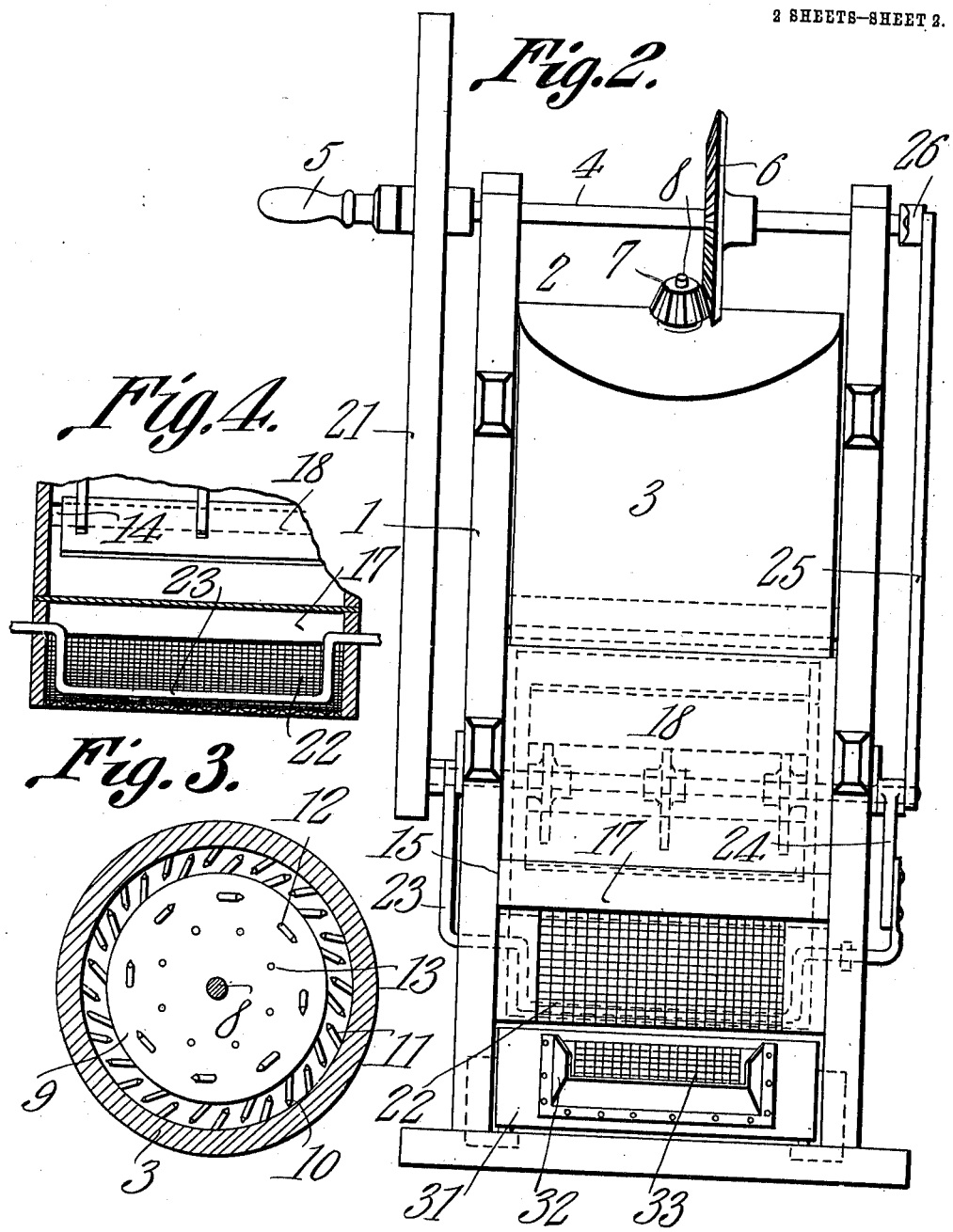

UNITED STATES PATENT OFFICE.

ROBERT E. WRIGHT, OF DALTON, GEORGIA.

PEA-THRESHER.

978,529.  Specification of Letters Patent.  Patented Dec. 13, 1910.

Application filed March 17, 1910. Serial No. 549,963.

*To all whom it may concern:*

Be it known that I, ROBERT E. WRIGHT, a citizen of the United States, residing at Dalton, in the county of Whitfield and State of Georgia, have invented a new and useful Pea-Thresher, of which the following is a specification.

This invention has relation to pea threshers and it consists in the novel construction and arrangement of its parts as hereinafter claimed.

The object of the invention is to provide a simple and effective apparatus adapted to operate upon peas in the hull to reduce the hulls to shreds or particles whereby the peas are liberated, and to provide means for separating the liberated peas from the particles of hulls.

With the above object in view the apparatus includes a frame having a hopper mounted thereon which communicates with a concave the object of which is pitched at an acute angle to a vertical line. A rotor is journaled in the said concave and is provided upon its periphery with a series of teeth having pointed ends. The inner wall of the concave is provided with teeth also having pointed ends, the pointed ends of the teeth in the concave being disposed in the opposite direction from the disposition of the pointed ends of the teeth upon the rotor. The upper end of the said concave communicates with the interior of the hopper. A wind trunk is located below the lower end of the concave and an endless belt is mounted for orbital movement in the lower portion of the frame of the apparatus and the upper run of the said belt is located in the said wind trunk. A fan is arranged to discharge a blast of air through the wind trunk and a screen is located below the lower front end of the said trunk. An agitator is arranged for reciprocatory movement over the said screen and a receptacle is located below the screen and is adapted to receive the peas which pass through the said screen.

In the accompanying drawing:—Figure 1 is a vertical sectional view of the pea thresher. Fig. 2 is an end elevation of the same. Fig. 3 is a top plan view of the rotor which forms a component part of the invention. Fig. 4 is a sectional view of the agitator compartment of the thresher.

The pea thresher consists of a frame 1 having a hopper 2 mounted upon its top. A concave 3 communicates at its upper end with the delivery end of the hopper 2 and the axis of the concave 3 is pitched at an acute angle to a vertical line. A shaft 4 is journaled for rotation in the upper portion of the frame 1 as illustrated and as in the accompanying drawing is provided at one end with a crank handle 5 but it is to be understood that in lieu of the said handle 5 a belt pulley may be substituted if desired. A beveled gear wheel 6 is fixed to the intermediate portion of the shaft 4 and meshes with a beveled pinion 7 fixed to the upper end of a shaft 8 which is concentrically journaled in the concave 3. A rotor 9 is mounted upon the lower portion of the shaft 8 and is provided upon its periphery with a number of teeth 10 having pointed ends 11 disposed in the direction in which the said rotor rotates. Therefore the teeth 10 are tangentially disposed with relation to arcs or circles struck from the center of the rotor. The rotor 9 is provided upon its upper end and in the vicinity of its periphery with inclined teeth 12 the upper pointed ends of which are disposed in the direction in which the said rotor rotates and the said rotor is provided upon its upper end with teeth 13 which are parallel with the axis of the rotor. As illustrated in Fig. 1 of the drawing, the upper edge portion of the rotor 9 projects above the bottom of the hopper 2, the object of which will be hereinafter explained. From the above description it will be seen that means are provided for transmitting rotary movement from the shaft 4 to the shaft 8 and the rotor 9.

A wind trunk 14 is mounted upon the frame 1 and is in an inclined position with its upper and lower sides approximately at a right angle to the axis of the concave 3 and the rotor 9 located therein. A roller 15 is journaled for rotation at the lower end of the wind trunk 14 and a roller 16 is journaled for rotation at the upper end thereof. An endless belt 17 (preferably of canvas) is arranged to move in an orbit about the rollers 15 and 16 and the upper run of the said belt 17 is adapted to pass longitudinally of the wind trunk 14 and above the bottom thereof.

A fan casing 17 is located upon the frame 1 adjacent the lower end of the wind trunk 14 and the said casing 17 has a delivery end or outlet which enters the receiving end of the said wind trunk 14. A fan 18 is journaled for rotation in the casing 17 and the shaft of the said fan is provided with a belt pulley 19. A belt pulley 20 is mounted upon the shaft 4 and a belt 21 passes around the pulleys 19 and 20 and is adapted to transmit rotary movement from the shaft 4 to the fan 18.

A sieve 22 is located below the lower end of the wind trunk 14 and a stirrer 23 is arranged for reciprocatory movement over the upper surface of the said sieve 22. One end of the stirrer 23 is fixed to one arm of a bell crank lever 24 which is fulcrumed upon the shaft of the fan 18 and the other arm of the said bell crank lever 24 is connected by means of a pitman 25 with a crank 26 fixed to the shaft 4. Thus it will be seen that as the said shaft 4 rotates reciprocatory movement is imparted to the pitman 25 which in turn will rock the bell crank lever 24 upon its fulcrum and reciprocate the stirrer 23 above the concave 22. A ratchet wheel 27 is fixed to the shaft of the roller 15 and a lever 28 is fulcrumed adjacent the said ratchet wheel 27. The lever 28 carries a spring pressed pawl 29 which is adapted to engage the ratchets of the wheel 27 and the lower free end portion of the said lever 28 is operatively connected with the stirrer 23 by means of a link 30. Thus it will be seen that as the stirrer 23 reciprocates the link 30 will be moved longitudinally and the lever 28 will be swung upon its fulcrum whereby the pawl 29 when moved in one direction will engage the ratchet of the wheel 27 and as the pawl is moved in the opposite direction it will engage the ratchet of the said wheel 27 and partially rotate the said wheel. Thus means are provided for intermittently moving the endless belt 17 about the rollers 15 and 16.

The operation of the pea thresher is as follows: Presuming that the peas in the hulls are deposited in the hopper 2 and the shaft 4 is rotated, the rotor 9 will rotate about the axis of the shaft 8 and as the peas in the hulls come in contact with the teeth 10 at the upper edge of the said rotor 9, the said peas are drawn down into the concave 3 and wiped against the teeth mounted upon the inner surface thereof. Thus the progress of the peas through the space between the periphery of the rotor 9 and the inner surface of the concave 3, is retarded and eventually the hulls of the peas are shredded or reduced to particles to such an extent that the peas are liberated from the hulls, and the peas together with the particles of hulls fall down upon the upper run of the endless belt 17. When the material enters the trunk 14 it is subjected to a blast from the fan 18 and consequently the hulls, which are the lighter particles, are blown out of the upper end of said trunk 14 whereas the peas and possibly some particles of the hulls will pass down along the upper run of the belt 17 and fall upon the sieve 22 below the lower run of the trunk 14. Inasmuch as the belt 17 moves at intervals and its upper run moves in the same direction as that in which the blast of air which passes through the trunk 14 travels, much of the heavier particles of hulls which otherwise might follow the peas are carried up together with the lighter particles of hulls. When the material falls upon the upper surface of the sieve 22 it is subjected to the action of the stirrer 23 and the peas are agitated to such an extent as to facilitate their passage through the mesh of the sieve 22 into the receptacle 31 located below the said concave.

The receptacle 31 may be in the form of a drawer fitting snugly in the lower portion of the frame 1 and having a spout 32 of the configuration generally known as a sacking device with a screen 33 located between the end of the receptacle and the said spout. Thus when it is desired to empty the drawer 31 and place the peas in sacks it is necessary only to remove the drawer 31 from the frame 1 and insert the spout 32 in the mouth of a sack and tilt the drawer 31 toward a vertical position when the peas will pass through the screen 33 into the sack while any particles of hulls which might have followed the peas into the receptacle 31 will be caught by the screen 33. By this arrangement it will be seen that the upper portion of the rotor actually enters the hopper 2 whereupon the teeth 10 upon the upper portion of the said rotor serve as means for drawing the material from the hopper 2 into the space between the periphery of the rotor and the inner surface of the concave 3. Also by reason of the fact that the axis of the rotor is pitched at an acute angle to a vertical line as soon as the peas are liberated from the hulls the peas may fall approximately in vertical lines through the concave 3 through the upper run of the belt 17 and thus as soon as the peas are separated from the hulls they may gravitate along the rotor and concave and consequently are not liable to be damaged by the teeth mounted upon the concave and rotor.

Having described the invention what I claim as new and desire to secure by Letters-Patent is:

A pea thresher comprising a frame, a hopper located thereon, a concave mounted upon the frame and having its axis disposed at an acute angle to a vertical line, the upper end of the concave communicating with the hopper, a rotor journaled in the concave and having an upper edge portion projecting into the hopper, teeth mounted upon the periphery of the rotor and upon the upper end thereof, and teeth mounted upon the inner side of the concave and at the upper end thereof and adapted to co-act with the teeth upon the rotor.

In testimony that I claim the foregoing as my own, I have hereto affixed my signature in the presence of two witnesses.

ROBERT E. WRIGHT.

Witnesses:
F. L. BERRY,
F. C. FLEMISTER.